(No Model.)

J. A. CROSSMAN & N. C. BUCH.
DEVICE FOR SWAGING SAW TEETH.

No. 343,658. Patented June 15, 1886.

WITNESSES.
Chas. N. Leonard.
Charles L. Thurber.

INVENTORS.
John A. Crossman,
And Nelson C. Buch,
PER
C. Bradford
ATTORNEY.

UNITED STATES PATENT OFFICE.

JOHN A. CROSSMAN AND NELSON C. BUCH, OF INDIANAPOLIS, INDIANA, ASSIGNOR TO E. C. ATKINS & COMPANY, OF SAME PLACE.

DEVICE FOR SWAGING SAW-TEETH.

SPECIFICATION forming part of Letters Patent No. 343,658, dated June 15, 1886

Application filed February 25, 1886. Serial No. 193,128. (No model.)

*To all whom it may concern:*

Be it known that we, JOHN A. CROSSMAN and NELSON C. BUCH, of the city of Indianapolis, county of Marion, and State of Indiana, have invented certain new and useful Improvements in Dies for Saw-Swages, of which the following is specification.

As is well-known to those skilled in the art, a saw-tooth to be successfully swaged must be subjected to a series of blows from the hammer or die, instead of to a single blow heavy enough to spread the teeth sufficiently, as, should the latter be resorted to, the teeth would generally be split or broken.

The object of our said invention is to produce a swage by which the saw-teeth may be given any degree of swage required without changing the position of the saw or its support, and this is accomplished by forming the male die of the swage with a series of cams, each of which shall project somewhat farther from the center of rotation than that which precedes it in operation.

Figure 1:
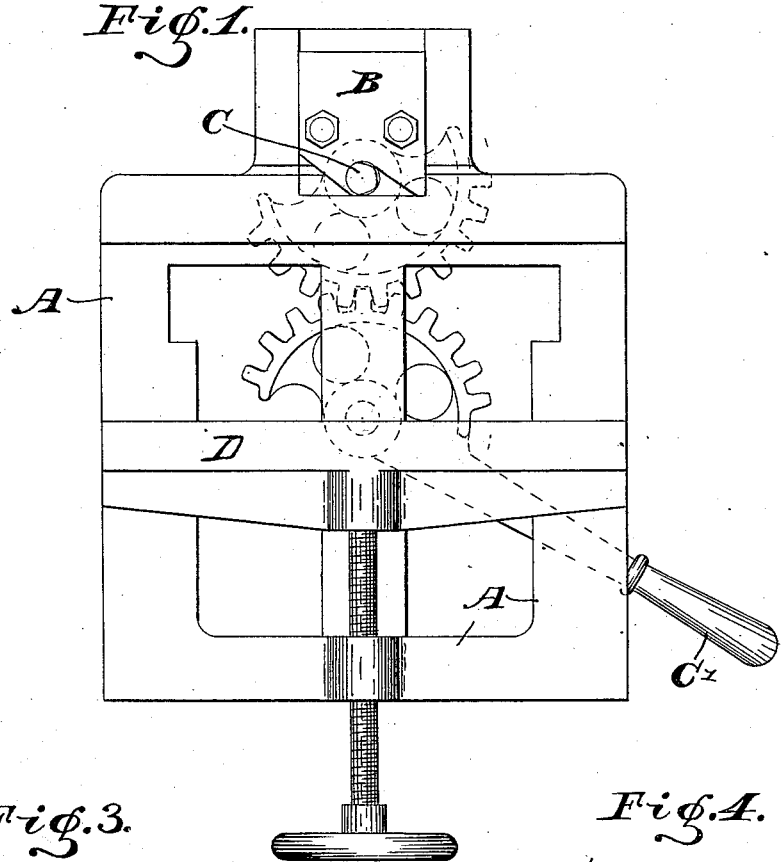
Figure 3:
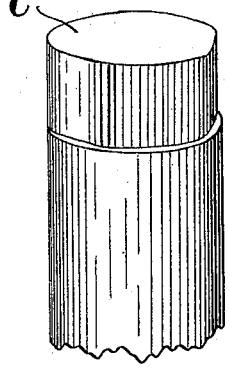
Figure 2:
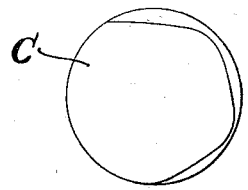

Referring to the accompanying drawings, which are made a part hereof, and on which similar letters of reference indicate similar parts, Figure 1 is a top or plan view of a swaging-machine embodying our invention; Fig. 2, a top or plan view on an enlarged scale of the point of the male die of the swage; Fig. 3, a perspective view of the same, and Fig. 4 a perspective view of a construction wherein the cams increase in size longitudinally of the die instead of circumferentially.

In said drawings, the portions marked A represent the frame-work of the swaging-machine; B, the female die; C, the male die, and D a support against which the saw will rest while being swaged.

This invention relates exclusively to the male die C, and this die has two or more distinct cam-surfaces (three are shown) arranged at increasing distances from the center of rotation, and may be arranged either circumferentially or longitudinally of the die, as indicated.

The operation has heretofore been to turn the die partly around, thus operating to some extent upon the saw-tooth, then to reverse the motion, push the saw-tooth in a little farther, and repeat the operation until the teeth are completely swaged.

Figure 4:
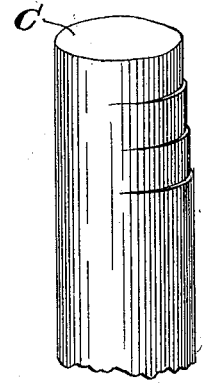

The use of our device is different, as will be readily understood. The point of the tooth is inserted, as usual, in the opening in the female die alongside the male die, and the operation is to revolve the male die by means of its handle C', (which is shown as connected thereto by gears, for the purpose of causing the die to rotate in the opposite direction to that in which the lever is operated,) thus bringing the cams thereon successively into contact with the tooth, each giving it an additional amount of swage without moving the saw at all. When the die is formed as shown in Fig. 4, in addition to revolving it, it must be pushed in somewhat as each cam-point finishes its operation upon the tooth, so that the next cam may do its work, and when these cams are arranged in line on one side of the die the handle must also be moved back and forth during the operation, instead of making a continuous revolution; but, as will be readily understood, the die may be so constructed that these cams will succeed each other circumferentially as well as longitudinally of the die, if so desired.

By the use of our improved die, as will be readily understood, the tooth is completely swaged without changing the position of the saw, the succeeding cams each operating upon the tooth. This is also accomplished when the construction shown in Figs. 1, 2, and 3 is employed without reversing the movement of the handle, which is a further advantage; but in either case the principal object of our invention, to swage the tooth evenly with the saw supported by a fixed rest, is accomplished.

Having thus fully described our said invention, what we claim as new, and desire to secure by Letters Patent, is—

The combination of the frame A, a support for the saw thereon, a female die or anvil, and a male die having a series of cam-surfaces arranged at increasing distances from the center of rotation, substantially as shown and specified.

In witness whereof we have hereunto set our hands and seals, at Indianapolis, Indiana, this 22d day of February, A. D. 1886.

JOHN A. CROSSMAN. [L. S.]
NELSON C. BUCH. [L. S.]

In presence of—
C. BRADFORD,
CHARLES L. THURBER.